United States Patent
Thiesen

(10) Patent No.: US 7,265,478 B2
(45) Date of Patent: Sep. 4, 2007

(54) RF CALIBRATION OF SAW INTERROGATORS

(75) Inventor: Jack Thiesen, Easley, MI (US)

(73) Assignee: Michelin Recherche et Technique S.A. (CH)

( * ) Notice: Subject to any disclaimer, the term of this patent is extended or adjusted under 35 U.S.C. 154(b) by 443 days.

(21) Appl. No.: 10/861,663

(22) Filed: Jun. 4, 2004

(65) Prior Publication Data

US 2005/0273289 A1 Dec. 8, 2005

(51) Int. Cl.
*H01L 41/08* (2006.01)
(52) U.S. Cl. .................................. 310/313 R
(58) Field of Classification Search ............... 310/311, 310/313 R, 334; 333/193–196
See application file for complete search history.

(56) References Cited

U.S. PATENT DOCUMENTS

| 5,262,977 | A | * | 11/1993 | Mitsutsuka | ................. 708/815 |
| 5,706,840 | A | * | 1/1998 | Schneider et al. | ........ 134/56 R |
| 6,075,443 | A | * | 6/2000 | Schepps et al. | .......... 340/573.4 |
| 6,144,332 | A | * | 11/2000 | Reindl et al. | ................. 342/42 |
| 6,763,288 | B2 | * | 7/2004 | Caretta et al. | ................. 701/1 |
| 2002/0117005 | A1 | | 8/2002 | Vile et al. | |

FOREIGN PATENT DOCUMENTS

WO  WO 0247924 A1  6/2002

* cited by examiner

*Primary Examiner*—Mark Budd
(74) *Attorney, Agent, or Firm*—Dority & Manning, P.A.

(57) ABSTRACT

Disclosed is an apparatus and methodology for insuring measurement accuracy and performance reliability in the operation of devices employed to interrogate SAW devices. The present subject matter relates to an arrangement and methodology that provides an interrogator paired together with a separate receiver, which may comprise a second interrogator, functioning together to perform a self-testing operation. The interrogator may be a handheld device that is temporarily paired with a separate receiver or a like device or the interrogator may correspond to more or less permanently paired set of devices physically placed in an array.

7 Claims, 3 Drawing Sheets

RF CALIBRATION OF SAW INTERROGATORS

FIELD OF THE INVENTION

The present invention generally concerns interrogators for use with electronics assemblies that transmit information related to identification variables and/or measurements of selected physical or environmental conditions. More particularly, the subject calibration methodology utilizes a transmitter and receiver pair to evaluate sensed transmitter power. In an alternative embodiment, paired interrogator transceivers in a symmetrical arrangement yield self-evaluating devices for relaying digital data as well as sensed parameter information.

BACKGROUND OF THE INVENTION

The incorporation of electronic devices with pneumatic tire and wheel structures yields many practical advantages. Tire electronics may include sensors and other components for relaying tire identification parameters and also for obtaining information regarding various physical parameters of a tire, such as temperature, pressure, tread wear, number of tire revolutions, vehicle speed, etc. Such performance information may become useful in tire monitoring and warning systems, and may even potentially be employed with feedback systems to regulate proper tire parameters.

Yet another potential capability offered by electronics systems integrated with tire structures corresponds to asset tracking and performance characterization for commercial vehicular applications. Commercial truck fleets, aviation craft and earth mover/mining vehicles are all viable industries that could utilize the benefits of tire electronic systems and related information transmission. Radio frequency identification (RFID) tags can be utilized to provide unique identification for a given tire, enabling tracking abilities for a tire. Tire sensors can determine the distance each tire in a vehicle has traveled and thus aid in maintenance planning for such commercial systems. Vehicle location and performance can be optimized for more expensive applications such as those concerning earth-mining equipment.

One particular type of sensor, or condition-responsive device, that has recently become desirable for use in certain tire electronics systems to determine various parameters related to a tire or wheel assembly is an acoustic wave device, such as a surface acoustic wave (SAW) device. SAW devices have desirable properties for certain sensor applications since they are sensitive, use very little power, and can be operated at RF frequencies convenient for relaying information in a wireless fashion. SAW devices may include at least one resonator element made up of interdigitated electrodes deposited on a piezoelectric substrate.

When an electrical input signal is applied to a SAW device, selected electrodes cause the SAW to act as a transducer, thus converting the input signal to a mechanical wave in the substrate. Other structures in the SAW reflect the mechanical wave and generate an electrical output signal. In this way, the SAW acts like an electromechanical resonator. A change in the output signal from a SAW device, such as a change in frequency, phase and/or amplitude of the output signal, corresponds to changing characteristics in the propagation path of the SAW device. In some SAW device embodiments, monitored device frequency and any changes thereto provide sufficient information to determine parameters such as temperature, and strain to which a SAW device is subjected.

Additional background information regarding RFID technology and SAW devices may be had by reference to co-pending, commonly owned U.S. patent application Ser. No. 10/697,576, filed Oct. 30, 2003, entitled "Acoustic Wave Device With Digital Data Transmission Functionality" incorporated herein for all purposes.

In conventional implementations of SAW devices in tire-related applications, SAW sensors transmit information about the parameters being sensed. However, it is often the case that in radio frequency transmissions systems, especially low power systems, signal strength and/or noise, or more specifically the signal to noise ratio (S/N) becomes a limiting factor. While various implementations of acoustic wave devices such as SAW sensors in tire electronic systems have been developed, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved methodology for the testing and calibration of interrogators for use with SAW based devices has been developed. It should be noted that although the principle portion of the remainder of the present disclosure may refer to the use of SAW based devices as being integrated with a tire or wheel structure, neither such use nor such particular type device is a limitation of the present technology as, in fact, such devices, whether SAW based or not, may be used in combination with a variety of other devices or elements or even as stand alone environmental sensors.

In an exemplary configuration, SAW based devices may include an acoustic wave device connected as a feedback element in an oscillator/amplifier and may be further coupled to an antenna element, thus forming an active transmitter arrangement. The acoustic wave device determines the carrier frequency (or frequencies) produced by such an active transmitter, and therefore, the frequency (or frequencies) of the transmitted RF signal represents one or more sensed parameters with the acoustic wave device itself functioning as a sensor. At the same time, the transmitted signal amplitude may be controlled by means of a separate circuit connected to the oscillator amplifier.

In one of their simpler forms, the transmitted signal from a SAW based device is switched on and off in a timed sequence, but other methods are possible. Positive aspects of this information transmission methodology include circuit simplification and power savings. For example, instead of requiring the circuitry in the tire to measure the sensed parameters, covert them to digital format, and encode them in a transmitted digital data stream, the sensed parameter information is conveyed through the transmitted RF frequency. Such methodology provides for the transmission of any other information desired, however complex or simple, by amplitude modulation of the transmitted signal. Such a circuit configuration provides for the ability to actively transmit a combination of information from integrated tire electronics to a remote receiver location. The combination of information may correspond to the physical parameters sensed by the acoustic wave device as well as digital data superimposed on the RF signal emitted by the acoustic wave device by selectively switching the amplifier on and off.

Another positive aspect of this type of device is that versatility is afforded to the types of information that can be transmitted via the electronics assemblies. Such information can include sensed information relating to parameters such as temperature and pressure associated with a tire or wheel assembly. Other information may include selected combinations of a unique tag identification, distance traveled, number of tire revolutions, vehicle speed, amounts of tread wear, amounts of tire deflection, the amount of static and/or dynamic forces acting on a tire, etc. So many different types of information are possible in part because a microcontroller can be configured to modulate any type of desired data on the RF output signal(s) from the electronics assembly and the subject calibration methodologies are able to insure reliable reception of the transmitted data.

Having recognized the above mentioned positive aspect associated with SAW based devices, the present subject matter recognizes and addresses the fact that there are, never the less, negative aspects associated with SAW based devices that are based on the retransmission of RF energy. Significant among these aspects is the extremely low power level at which the SAW devices transmit signal energy. While such low signal levels may be considered a positive aspect when considering operating energy requirements, these low levels, coupled with other aspects present challenges to data reception and recovery. More specifically, operation of SAW based devices at such low signal level, coupled with often hostile operating conditions and environments, may produce such low signal to noise (S/N) ratios that the accuracy and performance characteristics of the SAW based device's interrogation systems may be compromised.

In accordance with aspects of certain embodiments of the present subject matter, methodologies are provided to insure proper operation of the interrogation systems associated with SAW based devices. More particularly, methodologies have been developed to verify that the interrogators themselves are operating within established specifications.

In accordance with certain aspects of other embodiments of the present subject matter, methodologies have been developed to track the performance of SAW based device interrogators over the operational lifetime of the interrogators to insure reliable identification of data read problems and to provide a means for diagnosing such problems.

In accordance with yet additional aspects of further embodiments of the present subject matter, apparatus and accompanying methodologies have been developed to establish the health of the communications channel between a SAW device and it's associated interrogator.

According to yet still other aspects of additional embodiments of the present subject matter, apparatus and methodologies have been developed to insure the accurate reporting of read data by providing a mechanism for performance testing that may be easily employed prior to each and every data read operation.

In accordance with yet still further aspects of still further embodiments of the present subject matter, methodologies have been developed to account for the effects of ambient interference or background noise affecting the communication channel between a SAW device and it's associated interrogator.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
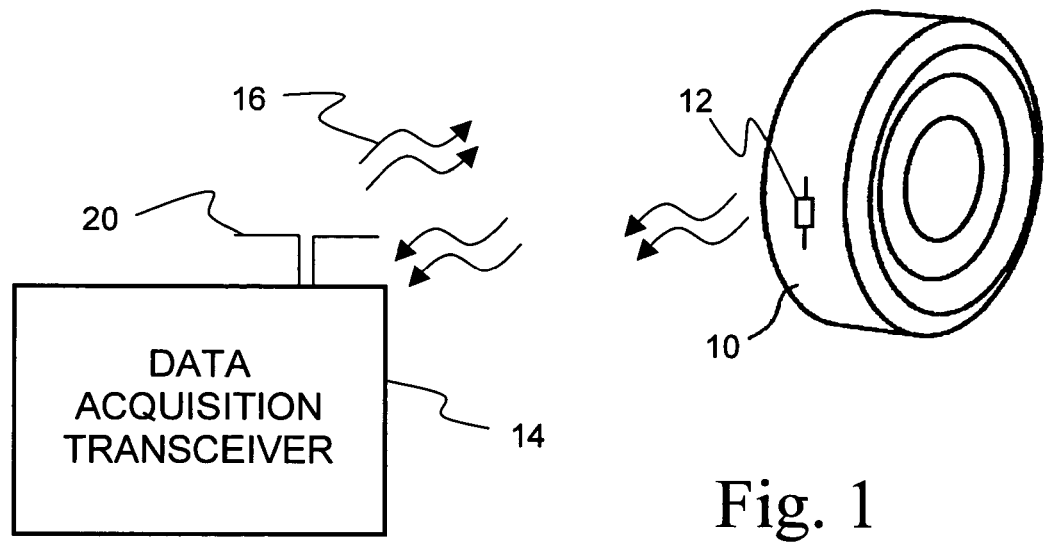
FIG. 1 diagrammatically illustrates an operational relationship between an interrogator and a SAW based device mounted in a tire according to known practices.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with the testing and calibration of interrogators for use with electronics assemblies that monitor and relay various information possibly related to tire identification and/or measurements of selected physical conditions associated with a tire, a wheel assembly, or some other item or area of interest.

Selected combinations of aspects of the disclosed technology correspond to a plurality of different embodiments of the present invention. It should be noted that each of the exemplary embodiments presented and discussed herein should not insinuate limitations of the present subject matter.

Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject tire electronics assemblies. Referring now to the drawings, FIG. 1 illustrates aspects of a known tire monitoring system with a passively operating electronics assembly, including a condition-responsive device, such as an acoustic wave sensor. Tire structure 10 may incorporate a condition-responsive device 12 to monitor various physical parameters such as temperature or pressure within the tire or associated wheel assembly. Such a condition-responsive device may include at least one resonator-type sensor, such as a surface acoustic wave (SAW) resonator or a bulk acoustic wave (BAW) resonator. It should be appreciated in accordance with the present technology that a condition-responsive device can correspond to either of these specific types of sensors or to any commercially available acoustic wave sensor or other type of sensor that is resonant at a suitable frequency or frequencies. The passively operating assembly with condition-responsive device 12 of FIG. 1 may be energized by a remote source. Thus, a data acquisition transceiver 14 is typically provided with both transmitter and receiver electronics to communicate with the condition-responsive device 12. RF pulses 16 transmitted from the antenna 20 of the transceiver 14 to the electronics assembly in tire 10 excite the SAW device, which may then store some of this energy and transmit a signal back to the transceiver at the end of each energizing RF pulse.

Referring still to FIG. 1, transceiver 14 transmits an interrogation signal 16 that is intended to energize a given condition-responsive device 12 at its frequency of natural oscillation (resonant frequency) such that after an excitation pulse, each resonator element in condition-responsive device 12 radiates energy stored during excitation. Peak levels of this radiated energy occur at the respective resonant frequencies of the resonator elements in the condition-responsive device 12. Such signals are then received at the transceiver 14. By monitoring changes in the frequency of the signal transmitted back from condition-responsive device 12, information corresponding to preselected condition(s) within tire structure 10 can be determined.

In accordance with aspects of the present invention, a condition-responsive device 12 may be provided that relays information in addition to the parameters sensed merely by the condition-responsive device itself. Such information may include, but is not limited to, data relating to the specific tire to which the condition-responsive device 12 is associated including manufacturing information, tire information, and other types of data as may be of interest. Such a condition-responsive device may be provided in conjunction with a tire structure in a variety of fashions. For instance, condition-responsive device 12 may be attached to the interior of a tire structure or some other location relative to a wheel assembly. Alternatively, condition-responsive device 12 may be embedded within a tire structure itself. Still further, condition-responsive device 12 may be encased in an elastomer material with appropriate dielectric properties that may then be adhered to or embedded within a tire structure. The condition-responsive device 12 may also be packaged in any number of ways and may be attached to the wheel assembly, the valve stem, or in any other place which allows for substantially accurate measurement of environmental conditions such as temperature and pressure as associated with the tire. In accordance with the variety of possible locations for condition-responsive device 12, it will be appreciated in accordance with the present subject matter that a condition-responsive device "integrated" with a tire structure or wheel assembly is intended to encompass all such possible locations and others as within the purview of one of ordinary skill in the art.

Figure 2:
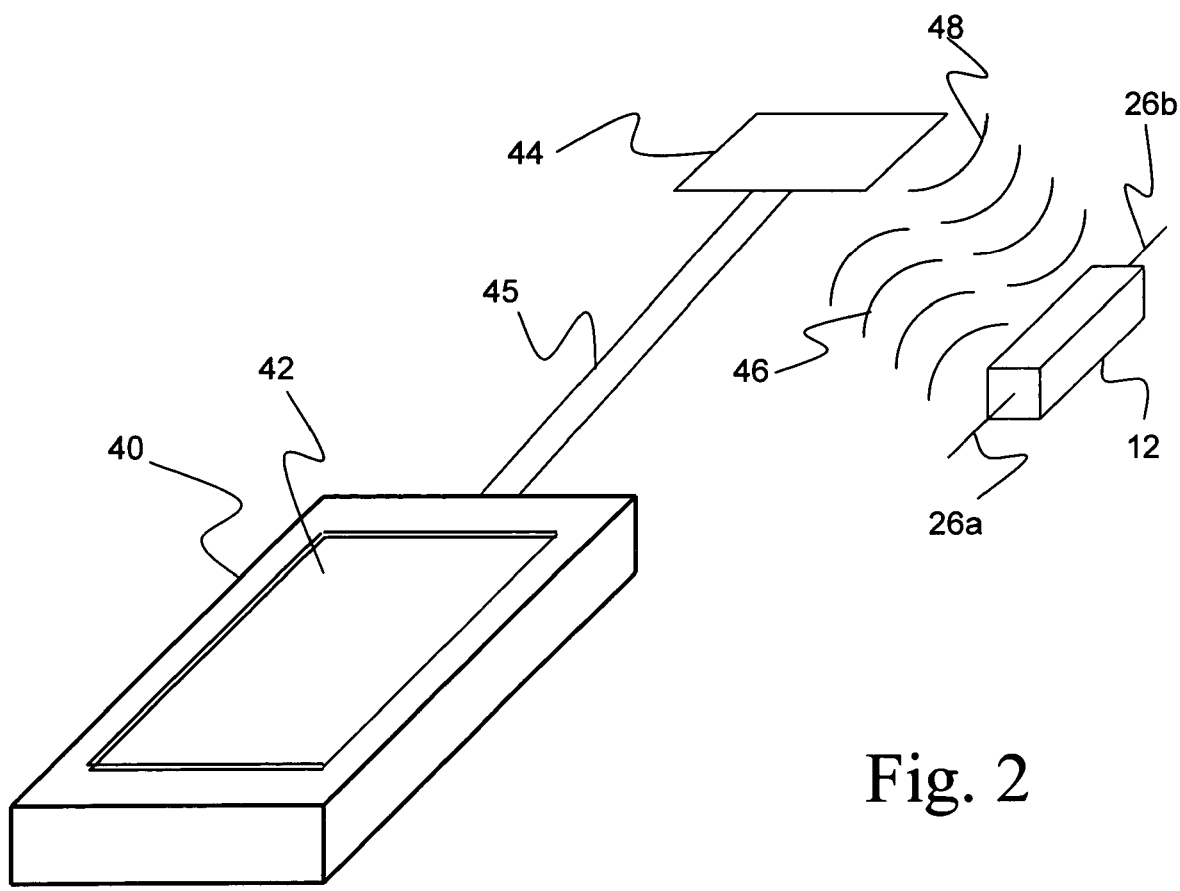
FIG. 2 illustrates a basic operational relationship between a handheld interrogator and a SAW based device.

With reference now to FIG. 2, there is illustrated an exemplary embodiment of a handheld interrogator 40 for use with condition-responsive device 12. Interrogator 40 includes a display panel 42 for displaying data read from condition-responsive device 12 and may also display other information relative to the interrogator 40 itself, for example, battery level or software version information. Display panel 42 may also be configured as a "touch" panel so as to perform the dual purpose of display and input control for the interrogator 40. Alternatively, control elements (not shown) may be mounted to the exterior of the interrogator to provide control of it's various functions. An antenna 44 is mounted to interrogator 40's main housing and supported remotely from the main housing by a support element 45.

In normal operation, interrogator 40 may be programmed to transmit one or more signals 48 to condition-responsive device 12. These signals, received by the condition-responsive device 12 via antennae 26a, 26b, may be used to instruct the condition-responsive device 12 to transmit collected and/or otherwise stored data to be read by the interrogator 40. The transmitted signal 48 may also be rectified by elements within condition-responsive device 12 to supply operating power to the device. Alternatively, depending on the specific type of condition-responsive device 12 involved, interrogator 40 may only be required to read continuously or intermittently transmitted signals 46 transmitted autonomously by condition-responsive device 12. There is the possibility also that the mutual operation of interrogator 40 and condition-responsive device 12 may require some combination of the two previously discussed operational modes. For example, interrogator 40 may not function as the power source for the condition-responsive device, but may be required to send a signal instructing the condition-responsive device 12 to "download" or transmit data. All such variations in operational characteristics are considered to be within the scope of the present subject matter.

As previously noted, one of the aspects involved with the operation of interrogator and RFID electronics assembly combinations is the heavy dependency of system accuracy and performance on the signal to noise (S/N) ratio of signals transmitted between the interrogator 40 and condition-responsive device 12. There is, therefore, a need to be able to verify that the interrogators themselves are operating within specification. This verification should be performed over the life of the interrogator to insure that if the system reports a read problem, possibly indicated by too large a standard deviation, that there is a means of diagnosing the problem. In accordance with the present subject matter, a method has been developed to accomplish this objective by using a separate receiver to independently measure the transmitter output power from an interrogator. As an alternative, two interrogation systems with opposed antennas may be employed. These concepts are illustrated respectively in FIGS. 3 and 4.

Figure 3:
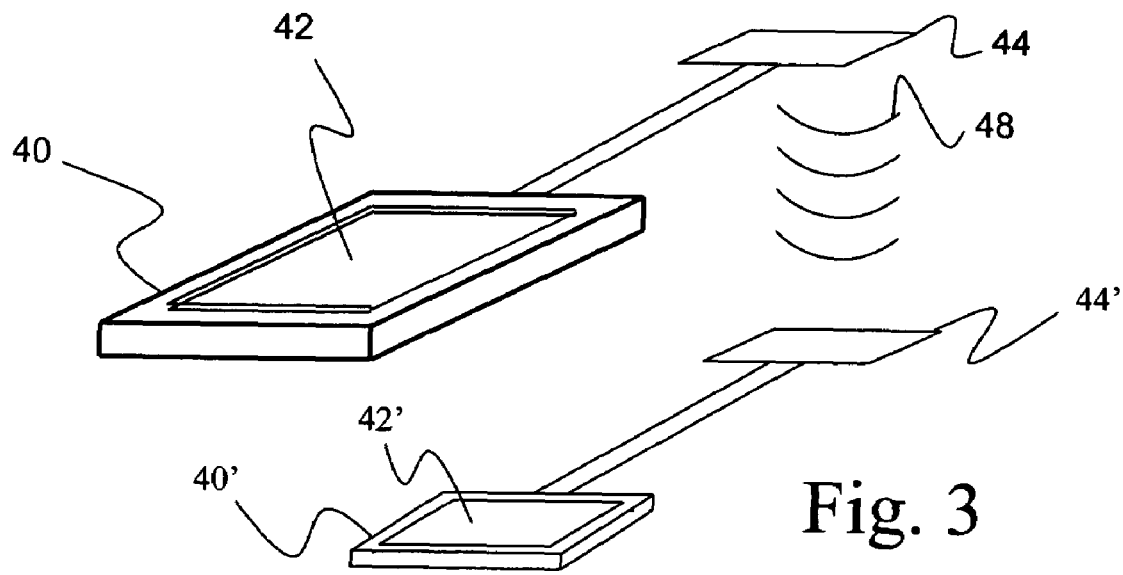
FIG. 3 illustrates a technique for verifying the operational capabilities and calibration of handheld interrogators in accordance with an exemplary embodiment of the present subject matter.

With reference to FIG. 3, there is illustrated a first exemplary embodiment of the present subject matter in the form of a paired interrogator 40 and separate, dedicated, receiver 40'. The receiver 40' may correspond to a relatively simple RF detector configuration comprising an antenna 44' and a detector circuit as simple as a rectifier diode and metering element connected in circuit therewith or a more sophisticated receiver configuration may be employed. The receiver 40' may include a display 42' similar to that of the interrogator 40 to include not only a display, but also a touch screen control for the receiver. Alternatively, the receiver 40' may include control elements (not shown) mounted to the receive housing. Of significance to the present invention is the concept that the separate receiver 40' is physically placed at a predetermined, controlled distance from the interrogator 40 such that the separate receiver 40' may obtain consistent, distance specific, power output readings from the interrogator 40. A mounting arrangement (not shown) of suitable design may be employed to more easily effect precise placement of the interrogator 40 and separate receiver 40'. Taking such power output readings over time may assist in insuring accurate calibration of the interrogator 40. In addition, further useful data may be developed regarding ambient RF noise levels in the vicinity of the interrogator to insure that the signal to noise level within the operating environment is sufficient to obtain accurate readings from the interrogator. For example, a reading of ambient RF signals may be taken by the separate receiver 40' prior to energizing the interrogator 40 to establish a background noise level. Such readings may, for example, provide an opportunity to adjust the power output of the interrogator transmitter to take into consideration ambient noise levels to insure an adequate signal to noise ratio. Alternatively, in the instance of low ambient noise, interrogator transmitter power levels may be lowered to conserve interrogator battery power while yet maintaining adequate signal to noise level to assure accurate data recovery.

Figure 4:
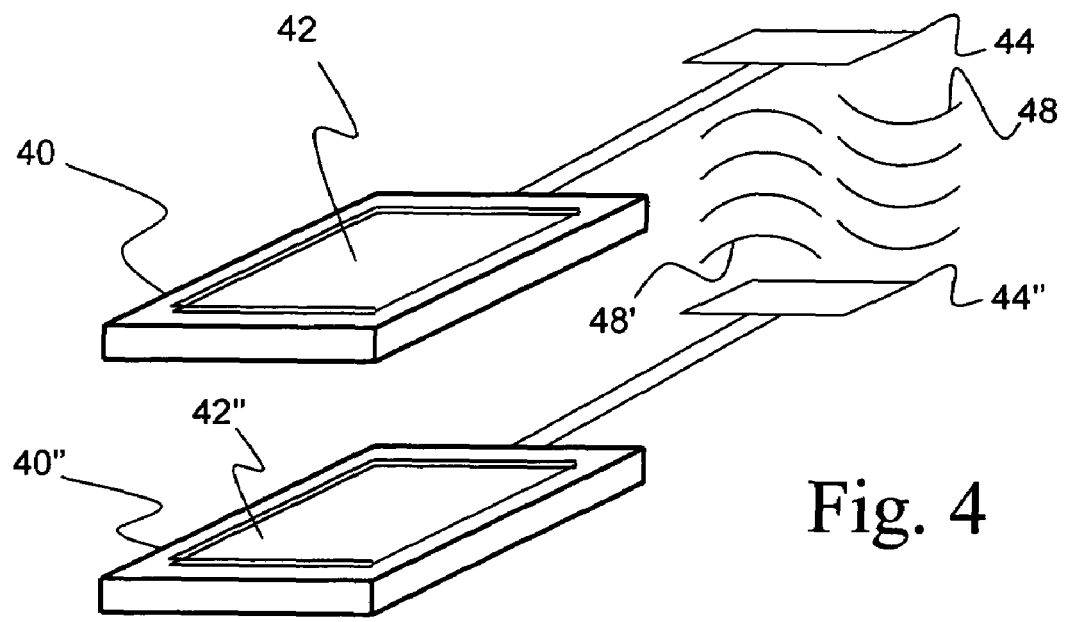
FIG. 4 illustrates an alternative technique for verifying the operational capabilities and calibration of handheld interrogators using paired interrogators in accordance with another exemplary embodiment of the present subject matter.

With reference to FIG. 4, there is illustrated a second exemplary embodiment of the present subject matter in the form of a pair of interrogators 40, 40". Interrogators 40, 40" each include a display and/or touch control panel 42, 42' as well as individual antennas 44, 44". As illustrated in FIG. 4, the interrogators 40, 40" are physically placed in spaced opposition to each other at a selected, controlled distance. As with the first exemplary embodiment, a mounting arrangement (not shown) of suitable design may be employed to more easily effect precise placement of the interrogators. The exact separation between the interrogators is a matter of choice, it only being required that the separation distance chosen is within the operational range of the interrogators and, of equal importance, that the same distance is used for any and all calibration/test sequences. Interrogators 40, 40" are configured such that a calibration mode may be initiated for each interrogator. Such configuration may include, but is not limited to, provision of additional firmware or software with the operational control elements of the interrogators that permits self-calibration and/or testing of the interrogators.

A typical example of a test/calibration sequence may include verification of the transmit power from a selected interrogator 40 or 40". Such a test may be accomplished by transmitting a signal 48 from interrogator 40 and measuring the signal level received by an opposing paired interrogator 40" and vice-versa. Moreover, the receiver portion of each of the transceivers 40, 40" may be employed to obtain ambient background RF level readings for it's paired transceiver to establish accurate background noise levels for the separated interrogators. By exchanging test signals between opposed interrogators and using reference values established when the units are new or immediately after calibration or servicing, the performance of the interrogators can be continually tracked and a request for service can be generated upon observation of significant deviations from previously established reference norms prior to any interrogator failure.

Figure 5:
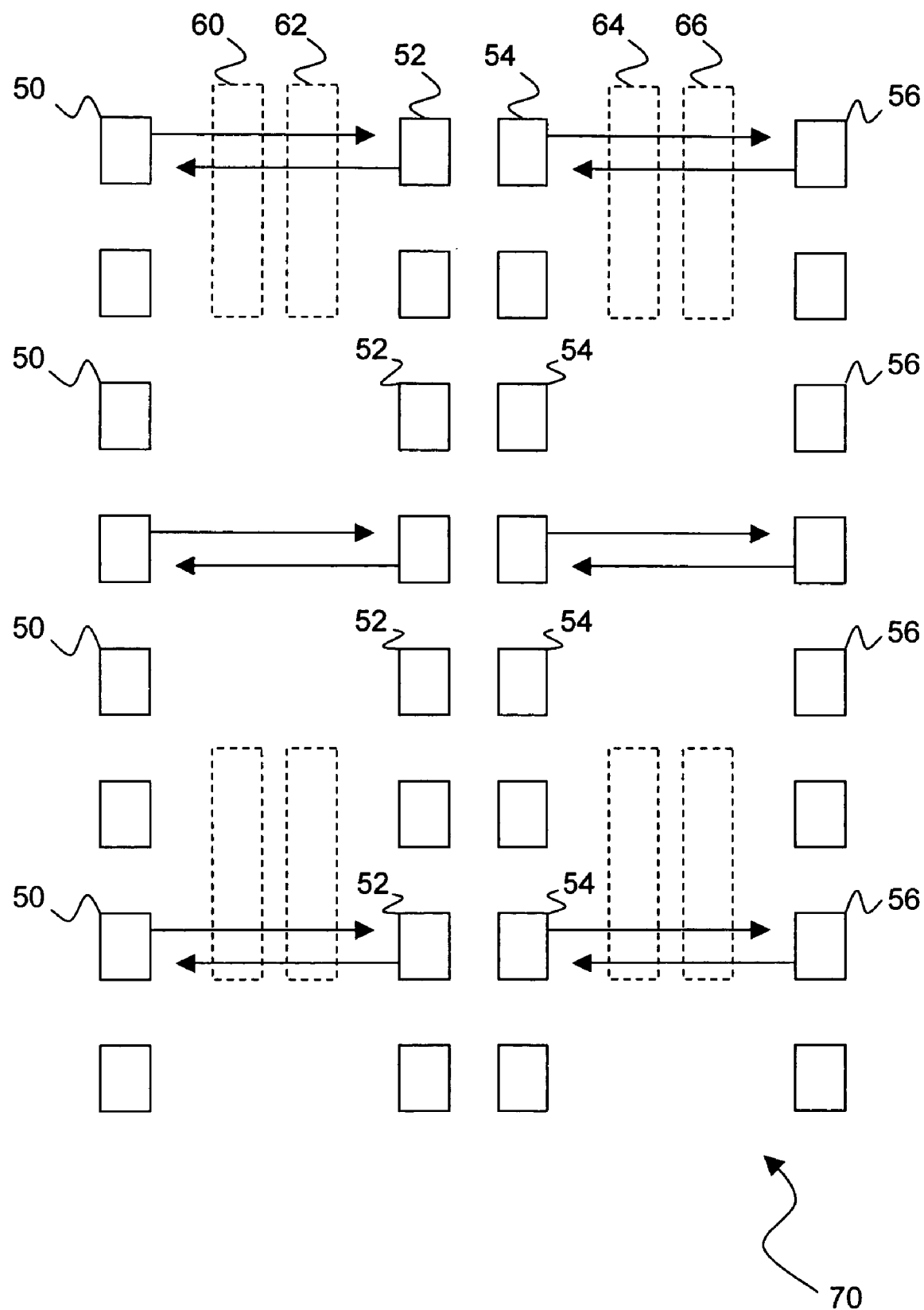
FIG. 5 schematically illustrates an exemplary application of the present subject matter to a vehicle tire-monitoring lane in accordance with yet another embodiment of the present subject matter.

With reference now to FIG. 5, a third exemplary embodiment of the present subject matter will now be described. Illustrated in FIG. 5 is an exemplary configuration of a drive-by interrogator arrangement of this embodiment of the present subject matter. In this exemplary configuration, a plurality of interrogators 50, 52, 54, 56 are arranged in an array of four columns, each containing eight interrogators. As should be evident to those of ordinary skill in the art, the exact total number of interrogators included in such an array would depend on the specific use to which the array is placed. In the presently illustrated exemplary configuration, the array of interrogators is configure to permit a multi-wheeled vehicle to pass through a lane 70 with the interrogators positioned in such manner as to allow the tires 60, 62, 64, 66 of such a vehicle to pass between adjacent columns of interrogators. In this manner and under normal operations interrogator 50 is in a position to read data from tire 60 while interrogator 62 reads data from tire 62, interrogator 54 from tire 64, and interrogator 56 from tire 66.

An important aspect arising from the exemplary embodiment of the present subject matter illustrated in FIG. 5 is that the various interrogators of the array are normally placed in fixed relationships to one another. Such placement allows the antennas that are normally placed in opposition to each other to partner with its opposing antenna to perform the testing function. In fact, since the antenna array elements permanently have available to them a paired antenna, the system can be configured to perform a testing operation prior to every data read. Moreover, passage of such an "each and every" read test may be used as a gating criterion prior to allowing a vehicle to enter the lane.

Yet another significant aspect arising from the permanent placement of an array of interrogators resides is the fact that since the interrogators are positioned in their normal use positions, the constant availability of a testing partner interrogator allows the array to test the health of the communications channel between interrogators prior to every read. Such testing allows the system to adjust power levels to compensate for deleterious effects such as from rain, snow, ice and other adverse environmental conditions.

With respect to each of the previously discussed exemplary embodiments of the present subject matter, the various tests performed may include such as frequency, power, noise floor, clock stability, and distortion. In order for the interrogators to perform such tests, each interrogator may have incorporated therein additional circuitry, firmware, or software that will allow a diagnostic routine to be run while at the same time adjusting transmitter frequency and power levels in predictable ways as well as the ability to measure the same.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for calibrating a SAW interrogator, comprising the steps of:

providing a SAW interrogator having a transmitter portion, a receiver portion, and a control portion;

providing an independent receiver;

positioning said SAW interrogator and independent receiver in a predefined spaced relationship;

transmitting a signal at a predetermined frequency and power level from the transmitter portion of the SAW interrogator;

receiving the signal transmitted from the transmitter portion of the SAW interrogator by the independent receiver;

measuring selected characteristics of the signal received by the independent receiver; and comparing the measured characteristics of the signal received by the independent receiver to a first set of predetermined reference values, whereby the result of the step of comparing provides an indication of the operational characteristics of said interrogator.

2. The method of claim 1, further comprising the step of employing said independent receiver to measure ambient radio frequency signal levels prior to the step of transmitting.

3. The method of claim 1, further comprising the steps of:

periodically repeating the steps of transmitting, receiving, measuring, and comparing;

recording measurements made during each step of measuring; and analyzing the recorded measurements to detect variations in measured values.

4. The method of claim 1, wherein the step of providing an independent receiver comprises providing a second SAW interrogator having a transmitter portion, a receiver portion, and a control portion.

5. The method of claim 4, further comprising the step of employing the receiver portion of said second SAW interrogator to measure ambient radio frequency signal levels prior to the step of transmitting.

6. The method of claim 4, further comprising the steps of:

transmitting a signal at a predetermined frequency and power level from the transmitter portion of said second SAW interrogator;

receiving the signal transmitted from the transmitter portion of second SAW interrogator by the receiver portion of the first named SAW interrogator;

measuring selected characteristics of the signal received by the receiver portion of said first named SAW interrogator; and comparing the measure characteristics of the signal received by the receiver portion of said first named SAW interrogator to a second set of predetermined reference values.

7. The method of claim 6, further comprising the step of selecting the first and second set of predetermined reference values based on values established immediately following manufacture or calibration of the respective first named or second interrogator.

* * * * *